(12) United States Patent
DeBruin et al.

(10) Patent No.: US 7,834,109 B2
(45) Date of Patent: Nov. 16, 2010

(54) SYSTEM FOR PRODUCING LOW IMPURITY POLYESTER

(75) Inventors: Bruce Roger DeBruin, Lexington, SC (US); Richard Gill Bonner, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 276 days.

(21) Appl. No.: 11/952,203

(22) Filed: Dec. 7, 2007

(65) Prior Publication Data

US 2009/0149626 A1 Jun. 11, 2009

(51) Int. Cl.
  *C08G 63/02* (2006.01)
  *B01J 19/18* (2006.01)
(52) U.S. Cl. .................. 526/67; 528/272; 560/98; 422/132
(58) Field of Classification Search ............... 526/67; 528/272; 560/98; 422/132
  See application file for complete search history.

(56) References Cited

U.S. PATENT DOCUMENTS

| | | | |
|---|---|---|---|
| 3,174,830 A | 3/1965 | Watzl et al. | |
| 3,590,072 A | 6/1971 | Leybourne | |
| 3,644,096 A * | 2/1972 | Lewis et al. | 422/197 |
| 3,644,483 A * | 2/1972 | Griehl et al. | 560/94 |
| 3,927,982 A | 12/1975 | Chapman et al. | |
| 4,146,729 A | 3/1979 | Goodley et al. | |
| 5,324,853 A | 6/1994 | Jones et al. | |
| 5,811,496 A | 9/1998 | Iwasyk | |
| 6,096,838 A | 8/2000 | Nakamoto et al. | |
| 6,100,369 A | 8/2000 | Miyajima et al. | |
| 6,641,700 B1 | 11/2003 | Matsumoto et al. | |
| 6,815,525 B2 | 11/2004 | DeBruin | |
| 6,906,164 B2 | 6/2005 | DeBruin | |
| 6,979,752 B1 * | 12/2005 | Bertola et al. | 568/617 |
| 7,074,879 B2 | 7/2006 | DeBruin et al. | |
| 7,084,234 B2 | 8/2006 | Wilhelm et al. | |
| 7,115,701 B2 | 10/2006 | Van Endert et al. | |
| 7,345,139 B2 | 3/2008 | DeBruin | |
| 7,649,109 B2 | 1/2010 | DeBruin | |
| 2002/0161166 A1 | 10/2002 | Nakane et al. | |
| 2003/0104203 A1 | 6/2003 | Tam et al. | |
| 2004/0197618 A1 | 10/2004 | Harada et al. | |
| 2005/0222371 A1 | 10/2005 | Wilhelm et al. | |
| 2007/0112173 A1 | 5/2007 | Kampf | |
| 2008/0051529 A1 | 2/2008 | Kampf | |
| 2008/0139760 A1 | 6/2008 | DeBruin | |
| 2008/0139779 A1 | 6/2008 | DeBruin | |

(Continued)

FOREIGN PATENT DOCUMENTS

EP 0105111 4/1984

(Continued)

OTHER PUBLICATIONS

Co-pending U.S. Appl. No. 11/715,564, filed Mar. 8, 2007.

(Continued)

*Primary Examiner*—Fred M Teskin
(74) *Attorney, Agent, or Firm*—Jennifer R. Knight; Bernard J. Graves, Jr.

(57) ABSTRACT

A polyester production facility capable of producing an esterified product stream having a low impurity concentration relative to product streams produced in conventional polyester production facilities.

25 Claims, 1 Drawing Sheet

U.S. PATENT DOCUMENTS

2008/0139780 A1    6/2008    DeBruin

FOREIGN PATENT DOCUMENTS

| GB | 1122538 | 7/1968 |
|----|---------|--------|
| GB | 1277376 | 6/1972 |
| JP | 2004/238329 | 8/2004 |
| WO | WO 2006/083250 | 8/2006 |
| WO | WO 2008/073288 A2 | 6/2008 |

OTHER PUBLICATIONS

Co-pending U.S. Appl. No. 11/715,546, filed Mar. 8, 2007.
International Search Report for PCT/US2008/013038 dated Apr. 6, 2009.
International Search Report for PCT/US2008/002270 dated Jun. 20, 2008.
International Search Report for PCT/US2008/002298 dated Jul. 31, 2008.
International Search Report for PCT/US2007/024926 dated Oct. 22, 2008.
International Search Report for PCT/US2007/025045 dated Jun. 13, 2008.
International Search Report for PCT/US2007/024931 dated Jun. 24, 2008.
Ekivina, N. I. et al., "Structure Formation in Terephthalic Acid Pastes," 1968, Chemical Abstracts Service, Columbus, OH.
Office Action dated Apr. 21, 2009 in copending U.S. Appl. No. 11/635,360.
Office Action dated Jan. 11, 2010 in copending U.S. Appl. No. 11/635,360.
Office Action dated Apr. 21, 2009 in copending U.S. Appl. No. 11/635,448.
Office Action dated Jan. 30, 2009 in copending U.S. Appl. No. 11/715,546.
Office Action dated Aug. 4, 2009 in copending U.S. Appl. No. 11/715,546.

* cited by examiner

SYSTEM FOR PRODUCING LOW IMPURITY POLYESTER

BACKGROUND OF THE INVENTION

1. Field of the Invention

This invention relates generally to a system for producing melt-phase polyesters. In another aspect, the invention concerns an esterification system for use in a polyester facility capable of producing a low-impurity polyester product.

2. Description of the Prior Art

Melt-phase polymerization can be used to produce a variety of polyesters, such as, for example, polyethylene terephthalate (PET). PET is widely used in beverage, food, and other containers, as well as in synthetic fibers and resins. Advances in process technology coupled with increased demand have lead to an increasingly competitive market for the production and sale of PET. Therefore, a low-cost, high-efficiency process for producing PET is desirable.

Generally, melt-phase polyester production facilities, including those used to make PET, employ an esterification stage and a polycondensation stage. In the esterification stage, polyester raw materials (i.e., reactants) are converted to polyester monomers and/or oligomers. In the polycondensation stage, polyester monomers and/or oligomers exiting the esterification stage are converted into a polyester product having the desired final chain length.

In most conventional melt-phase polyester production facilities, esterification is carried out in one or more mechanically agitated reactors, such as, for example, continuous stirred tank reactors (CSTRs). However, CSTRs and other mechanically agitated reactors have a number of drawbacks that can result in increased capital, operating, and/or maintenance costs for the overall polyester production facility. For example, the mechanical agitators and various control equipment typically associated with CSTRs are complex, expensive, and can require extensive maintenance. Further, conventional CSTRs frequently employ internal heat exchange tubes that occupy a portion of the reactor's internal volume. In order to compensate for the loss in effective reactor volume, CSTRs with internal heat exchange tubes require a larger overall volume, which increases capital costs. Further, internal heat exchange coils typically associated with CSTRs can undesirably interfere with the flow patterns of the reaction medium within the vessel, thereby resulting in increased impurity levels and an overall loss of conversion. To increase product conversion, many conventional polyester production facilities have employed multiple CSTRs operating in series, which further increases both capital and operating costs.

SUMMARY OF THE INVENTION

In one embodiment of the present invention, there is provided a process comprising: (a) subjecting a reaction medium to esterification in a heat exchanger to thereby produce a warmed product stream; (b) separating at least a portion of the warmed product stream into a predominantly liquid stream and a predominantly vapor stream in a disengagement vessel; and (c) recirculating at least a portion of the predominantly liquid stream to the heat exchanger via a recirculation loop, wherein the recirculation loop comprises a pump used to transport at least a portion of the predominantly liquid stream to the heat exchanger, wherein the pressure of the warmed product stream exiting the heat exchanger is within about 30 psi of the warmed product stream entering the disengagement vessel.

In another embodiment of the present invention, there is provided an esterification process comprising: (a) heating a reaction medium in a heat exchanger to thereby produce a warmed product stream, wherein esterification is carried out in the heat exchanger; (b) withdrawing at least a portion of the warmed product stream via an exchanger outlet of the heat exchanger; (c) introducing at least a portion of the warmed product stream into a disengagement vessel via a fluid inlet; (d) separating at least a portion of the warmed product stream introduced into the disengagement vessel into a predominantly liquid fraction and a predominantly vapor fraction; (e) withdrawing at least a portion of the predominantly liquid fraction from the disengagement vessel via a liquid product outlet to form a predominantly liquid stream; and (f) recirculating at least a portion of the predominantly liquid stream to an exchanger inlet of the heat exchanger via a recirculation loop, wherein the recirculation loop comprises a pump for transporting at least a portion of the predominantly liquid stream through the recirculation loop, wherein the pump defines a suction port located at a lower elevation than the liquid product outlet, wherein the liquid product outlet is spaced from the suction port of the pump by a first vertical distance ($Y_1$), wherein the exchanger outlet is spaced from the suction port of the pump by a second vertical distance ($Y_2$), wherein the ratio of the second vertical distance to the first vertical distance ($Y_2:Y_1$) is greater than 0.25.

In yet another embodiment of the present invention, there is provided an apparatus comprising a heat exchanger, a disengagement vessel, and a recirculation loop. The heat exchanger defines an exchanger inlet and an exchanger outlet. The disengagement vessel defines a fluid inlet and a liquid product outlet and the fluid inlet is in fluid flow communication with the exchanger outlet. The recirculation loop provides fluid flow communication between the liquid product outlet and the exchanger inlet. The recirculation loop comprises a pump that defines a suction port and a discharge port. The suction port of the pump is separated from the liquid product outlet of the disengagement vessel by a first distance ($Y_1$) and is separated from the exchanger outlet by a second vertical distance ($Y_2$). The ratio of the second vertical distance to the first vertical distance ($Y_2:Y_1$) is greater than 0.25.

BRIEF DESCRIPTION OF THE DRAWINGS

Certain embodiments of the present invention are described in detail below with reference to the enclosed FIGURE, wherein.

DETAILED DESCRIPTION

Figure 1:
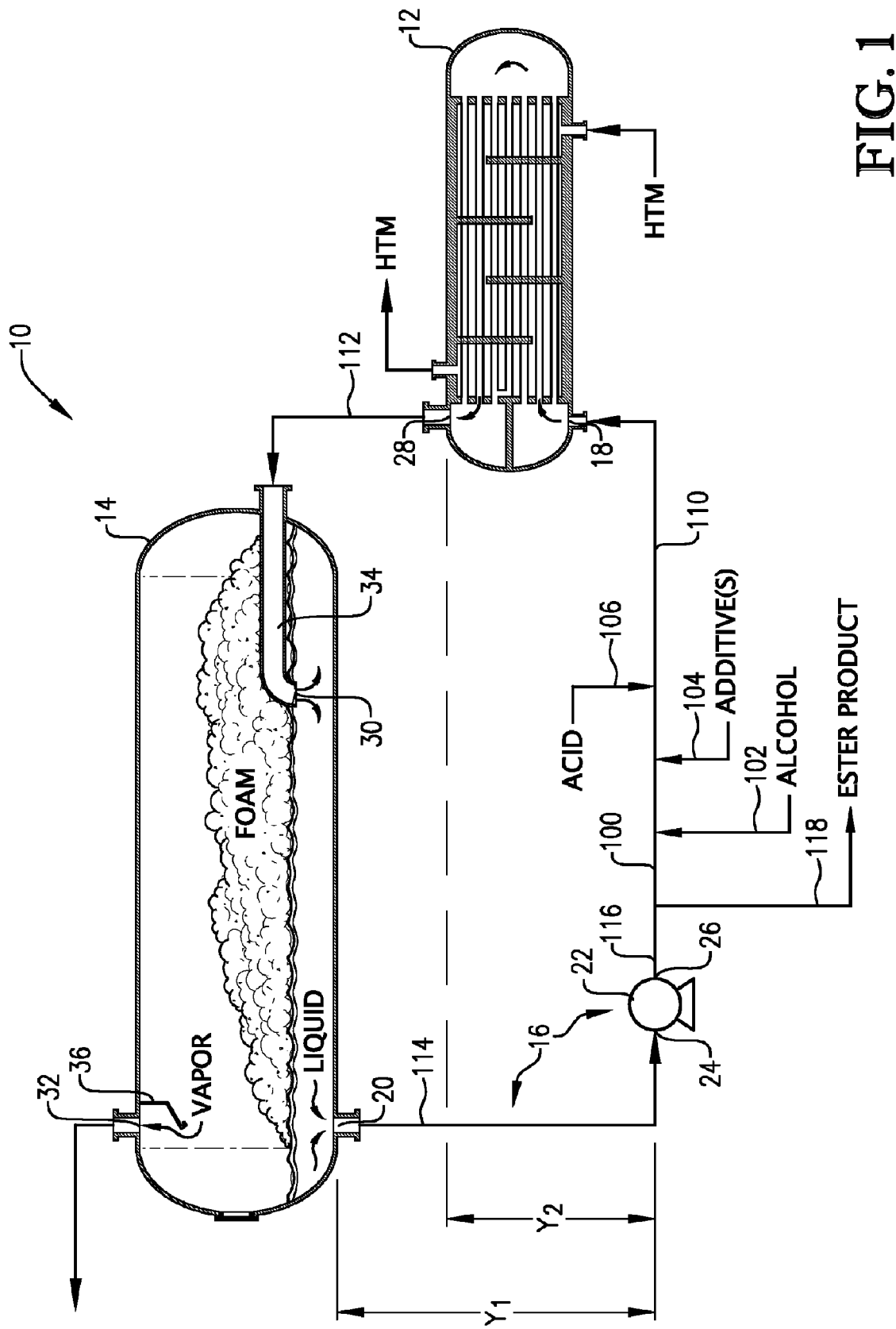
FIG. 1 is a schematic depiction of an esterification system configured in accordance with one embodiment of the present invention and suitable for use in a melt-phase polyester production facility.

The present invention can be employed in melt-phase polyester production facilities capable of producing a variety of polyesters from a variety of starting materials.

Examples of melt-phase polyesters that can be produced in accordance with the present invention include, but are not limited to, homopolymers and copolymers of polyethylene terephthalate (PET), PETG (PET modified with 1,4-cyclohexane-dimethanol (CHDM) comonomer), fully aromatic or liquid crystalline polyesters, biodegradable polyesters, such as those comprising butanediol, terephthalic acid and adipic acid residues, poly(cyclohexane-dimethylene terephthalate) homopolymer and copolymers, and homopolymers and copolymers of CHDM and cyclohexane dicarboxylic acid or dimethyl cyclohexanedicarboxylate. In one embodiment, a PET copolymer comprising at least 90 mole percent of ethylene terephthalate repeat units and up to 10 mole percent of added comonomer repeat units can be produced. Generally, the comonomer repeat units of the PET copolymer can be derived from one or more comonomers selected from the group comprising isophthalic acid, 2,6-napthaline-dicarboxylic acid, CHDM, and diethylene glycol (DEG).

In general, a polyester production process according to certain embodiments of the present invention can comprise two main stages: an esterification stage and a polycondensation stage. In the esterification stage, the polyester starting materials, which can comprise at least one alcohol and at least one acid, can be subjected to esterification to thereby produce polyester monomers and/or oligomers. In the polycondensation stage, the polyester monomers and/or oligomers can be reacted into the final polyester product.

The acid starting material can be a dicarboxylic acid such that the final polyester product comprises at least one dicarboxylic acid residue having in the range of from about 4 to about 15 or from 8 to 12 carbon atoms. Examples of dicarboxylic acids suitable for use in the present invention can include, but are not limited to, terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, diphenyl-3,4'-dicarboxylic acid, 2,2,-dimethyl-1,3-propandiol, dicarboxylic acid, succinic acid, glutaric acid, adipic acid, azelaic acid, sebacic acid, and mixtures thereof. In one embodiment, the acid starting material can be a corresponding ester, such as dimethyl terephthalate instead of terephthalic acid.

The alcohol starting material can be a diol such that the final polyester product can comprise at least one diol residue, such as, for example, those originating from cycloaliphatic diols having in the range of from about 3 to about 25 carbon atoms or 6 to 20 carbon atoms. Suitable diols can include, but are not limited to, ethylene glycol (EG), diethylene glycol, triethylene glycol, 1,4-cyclohexane-dimethanol, propane-1,3-diol, butane-1,4-diol, pentane-1,5-diol, hexane-1,6-diol, neopentylglycol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4tetramethyl-cyclobutanediol, 2,2-bis-(3-hydroxyethoxyphenyl)-propane, 2,2-bis-(4-hydroxy-propoxyphenyl)-propane, isosorbide, hydroquinone, BDS-(2,2-(sulfonylbis)4,1-phenyleneoxy)) bis(ethanol), and mixtures thereof.

In addition, in one embodiment, the starting materials can comprise one or more comonomers. Suitable comonomers can include, for example, comonomers comprising terephthalic acid, dimethyl terephthalate, isophthalic acid, dimethyl isophthalate, dimethyl-2,6-naphthalenedicarboxylate, 2,6-naphthalene-dicarboxylic acid, ethylene glycol, diethylene glycol, 1,4-cyclohexane-dimethanol (CHDM), 1,4-butanediol, polytetramethyleneglyocl, trans-DMCD, trimellitic anhydride, dimethyl cyclohexane-1,4 dicarboxylate, dimethyl decalin-2,6 dicarboxylate, decalin dimethanol, decahydronaphthalane 2,6-dicarboxylate, 2,6-dihydroxymethyl-decahydronaphthalene, hydroquinone, hydroxybenzoic acid, and mixtures thereof.

In accordance with one embodiment of the present invention, one or more additives can be added to the starting materials, the polyester, and/or the polyester precursors at one or more locations within the process. Suitable additives can include, for example, trifunctional or tetrafunctional comonomers, such as trimellitic anhydride, trimethylolpropane, pyromellitic dianhydride, pentaerythritol, or other polyacids or polyols; crosslinking or branching agents; colorant; toner; pigment; carbon black; glass fiber; filler; impact modifier; antioxidant; UV absorbent compound; and oxygen scavenging compound.

Both the esterification stage and the polycondensation stage can include multiple steps. For example, the esterification stage can include an initial esterification step for producing a partially esterified product that can then be further esterified in a secondary esterification step. Also, the polycondensation stage can include a prepolymerization step for producing partially condensed product that can then be subjected to a finishing step to thereby produce the final polymer product.

Generally, esterification can take place at a temperature in the range of from about 220° C. to about 300° C., or about 235° C. to about 280° C., or 245° C. to 275° C. and a pressure of from about −5 to about 35, about 5 to about 35, about 10 to about 25, or 12 to 20 psig. In one embodiment, the average chain length of the monomer and/or oligomer exiting the esterification stage can be less than about 25, from about 1 to about 20, or from 5 to 15.

Typically, polycondensation can be carried out at a temperature in the range of from about 220° C. to about 350° C., or about 240° C. to about 320° C. and a sub-atmospheric (i.e., vacuum) pressure. When polycondensation is carried out in a two-stage process, the prepolymerization (or prepolymer) reactor can convert the monomer and oligomer exiting the esterification stage into an oligomer/polymer mixture having an average chain length in the range of from about 2 to about 40, from about 5 to about 35, or from 10 to 30. The finisher reactor can then convert the oligomer/polymer mixture into a final polyester product having the desired average chain length.

Typically, "side" reactions can occur in the esterification and/or polycondensation stages that can produce one or more chemical species other than the desired monomer, oligomer, and/or polymer product (i.e., impurities). Diethylene glycol (DEG) is one example of a common impurity generated during PET production. In one embodiment of the present invention, the product stream exiting the esterification and/or polycondensation stages can have a substantially lower DEG content than similar product streams associated with conventional production facilities. For example, in one embodiment, the product stream exiting the esterification and/or polycondensation stages can have a DEG content of less than about 1.0 weight percent, less than about 0.75 weight percent, less than about 0.5 weight percent, or less than 0.4 weight percent, based on the total weight of the product stream. This is in direct contrast to conventional PET facilities, which typically produce product streams having a DEG content in the range of from 1.2 to 2.0 weight percent.

Referring now to FIG. 1, an esterification system 10 configured in accordance with one embodiment of the present invention is illustrated as generally comprising a heat exchanger 12, a disengagement vessel 14, and a recirculation loop 16. Because esterification can be carried out in both heat exchanger 12 and disengagement vessel 14, each of these pieces of equipment can be referred to as "esterification reactors" that each define a portion of an "esterification zone." However, because an additional function of heat exchanger 12 can be to heat the reaction medium processed therein, heat exchanger 12 can also define a "heating zone." Further, since an additional function of disengagement vessel 14 can be to promote vapor/liquid disengagement, disengagement vessel 14 can also be referred to as a "disengagement zone."

In general, recirculation loop 16 defines a flow passageway between an exchanger inlet 18 of heat exchanger 12 and a liquid product outlet 20 of disengagement vessel 14. Recirculation loop 16 can comprise a recirculation pump 22 defining a suction port 24 and a discharge port 26. Suction port 24 can be positioned at a lower elevation than both liquid product outlet 20 of disengagement vessel 14 and an exchanger outlet 28 of heat exchanger 12 by respective first and second vertical distances, $Y_1$ and $Y_2$. According to one embodiment of the present invention, the ratio of the second vertical distance to the first vertical distance ($Y_2$:$Y_1$) can be greater than about 0.25, or can be in the range of from about 0.4 to about 2.0, about 0.5 to about 1.5, or 0.9 to 1.1. In certain embodiments of the present invention, $Y_1$ and/or $Y_2$ can be in the range of from about 5 to about 200 feet, about 10 to about 150 feet, or 15 to about 50 feet.

In one embodiment, the reaction medium processed in esterification system 10 is subjected to little or no mechanical agitation. Although the reaction medium processed in esterification system 10 may be somewhat agitated by virtue of flowing through the process equipment and piping, this flow agitation is not mechanical agitation. In one embodiment of the present invention, less than about 50 percent, less than about 25 percent, less than about 10 percent, less than about 5 percent, or 0 percent of the total agitation of the reaction medium processed in heat exchanger 12 and/or disengagement vessel 14 of esterification system 10 can be provided by mechanical agitation. Thus, esterification systems configured in accordance with certain embodiments of the present invention can operate without any mechanical mixing devices. This is in direct contrast to conventional continuous stirred tank reactors (CSTRs) which employ mechanical agitation almost exclusively.

Referring to again FIG. 1, a yet-to-be-discussed recirculated product stream can flow through recirculation loop 16. Recirculation loop 16 is illustrated in FIG. 1 as generally comprising a product conduit 114 coupled to liquid outlet 20 of disengagement vessel 14, recirculation pump 22, a discharge conduit 116, a recirculation conduit 100, and an esterification feed conduit 110. In one embodiment, one or more reactants and/or additives can be added to the recirculated product stream in recirculation loop 16 via conduits 102, 104, and/or 106. In one embodiment, the recirculation product stream can comprise polyester monomers and/or oligomers. The presence of polyester monomers and/or oligomers in the recirculated product stream can enhance the dissolution of one or more reactant(s) and/or additive(s) added to the recirculated product stream. In one embodiment of the present invention, the recirculated product stream can have an average chain length in the range of from about 1 to about 20, about 2 to about 18, or 5 to 15.

In one embodiment, at least a portion of the streams in conduits 102, 104, and 106 can be added immediately upstream of (i.e., in product conduit 114) or directly into recirculation pump 22. In another embodiment illustrated in FIG. 1, at least a portion of the streams in conduits 102, 104, and 106 can be added downstream of recirculation pump 22 into recirculation conduit 100. The reactants and/or additives introduced into the recirculated product stream can be in solid, liquid, paste, or slurry form.

According to one embodiment, an alcohol (e.g., ethylene glycol) can be added to the recirculated product stream via conduit 102, while an acid (e.g., terephthalic acid) can be added to recirculation conduit 100 via conduit 104. Generally, the amount of alcohol and acid added to the recirculation stream in recirculation conduit 100 can be any amount necessary to accommodate the desired production rate and the desired alcohol-to-acid ratio. In one embodiment of the present invention, the molar alcohol-to-acid ratio of the resulting combined esterification feed stream in feed conduit 110 can be in the range of from about 1.005:1 to about 10:1, about 1.01:1 to about 8:1, or 1.05:1 to 6:1.

As illustrated in FIG. 1, the esterification feed stream in conduit 110 can enter exchanger inlet 18 of heat exchanger 12. In heat exchanger 12, the esterification feed/reaction medium can be heated and subjected to esterification conditions. In accordance with one embodiment of the present invention, the temperature increase of the reaction medium between exchanger inlet 18 and exchanger outlet 28 can be at least about 50° F., at least about 75° F., or at least 85° F. Generally, the temperature of the esterification feed entering exchanger inlet 18 can be in the range of from about 220° C. to about 260° C., about 230° C. to about 250° C., or 235° C. to 245° C., while the warmed esterification product stream exiting exchanger outlet 28 can have a temperature in the range of from about 240° C. to about 320° C., about 255° C. to about 300° C., or 275° C. to 290° C.

As discussed previously, heat exchanger 12 can also be considered an esterification reactor because at least a portion of the reaction medium flowing therethrough can undergo esterification. The amount of esterification carried out in accordance with the present invention can be quantified in terms of "conversion." As used herein, the term "conversion" is used to describe a property of the liquid phase of a stream that has been subjected to esterification, wherein the conversion of the esterified stream indicates the percentage of the original acid end groups that have been converted (i.e., esterified) to ester groups. Conversion can be quantified as the number of converted end groups (i.e., alcohol end groups) divided by the total number of end groups (i.e., alcohol plus acid end groups), expressed as a percentage. While conversion is used herein, it should be understood that average chain length, which describes the average number of monomer units that a compound comprises, could also be appropriate for describing the characteristics of the streams of the present invention as well.

According to one embodiment, the esterification reaction carried out in heat exchanger 12 can increase the conversion of the reaction medium between exchanger inlet 18 and exchanger outlet 28 by at least about 10, at least about 20, at least about 25, at least about 35, or at least about 50 percentage points. Generally, the esterification feed stream introduced into exchanger inlet 18 has a conversion of less than about 90 percent, less than about 75 percent, less than about 50 percent, less than about 25 percent, less than about 10 percent, or less than 5 percent, while the warmed esterification product stream exiting exchanger outlet 28 via conduit 112 can have a conversion of at least about 50 percent, at least about 60 percent, at least about 70 percent, at least about 75 percent, at least about 80 percent, at least about 85 percent, at least about 95 percent, or at least about 98 percent.

In one embodiment of the present invention, the esterification reaction carried out in heat exchanger 12 takes place at a reduced residence time relative to conventional esterification processes. For example, the average residence time of the reaction medium flowing through heat exchanger 12 can be less than about 60 minutes, less than about 45 minutes, less than about 35 minutes, or less than 20 minutes. This relatively short residence time can even be achieved at high, commercial scale production rates. Thus, in one embodiment, the product stream exits exchanger outlet 28 of heat exchanger 12 at a flow rate of at least about 10,000 pounds per hour (lb/h), at least about 25,000 lb/h, at least about 50,000 lb/h, or at least 100,000 lb/h.

As shown in FIG. 1, a stream of warm heat transfer medium (HTM) can enter the shell-side of heat exchanger 12 and at least partly surround at least a portion of the heat exchange tubes in order to heat the reaction medium flowing therethrough. In one embodiment of the present invention, the heat transfer coefficient associated with the heating of the reaction medium in heat exchanger 12 can be in the range of from about 0.5 to about 200 BTU per hour per ° F. per square foot (BTU/h·° F.·ft$^2$), about 5 to about 100 BTU/h·° F.·ft$^2$, or from 10 to 50 BTU/h·° F.·ft$^2$. The total amount of heat transferred to the reaction medium in heat exchanger 12 can be in the range of from about 100 to about 5,000 BTU per pound of reaction medium (BTU/lb), about 400 to about 2,000 BTU/lb, or 600 to 1,500 BTU/lb.

As depicted in FIG. 1, a stream of warmed, partially esterified reaction medium exits heat exchanger 12 via exchanger outlet 28 and can subsequently be routed to a fluid inlet 30 of disengagement vessel 14 via conduit 112. In one embodiment, the pressure of the warmed product stream exiting exchanger outlet 28 of heat exchanger 12 can be within about 30 psi, within about 20 psi, within about 10 psi, within about 5 psi, or within 2 psi of the pressure of the warmed product stream entering disengagement vessel 14 via fluid inlet 30. Generally, the pressure of the warmed product stream exiting exchanger outlet 28 can be in the range of from about −5 to about 35, about 5 to about 35, about 10 to about 25, or 12 to 20 psig.

As discussed previously, the warmed stream of partially esterified reaction medium entering fluid inlet 30 can be subjected to phase separation and further esterification in disengagement vessel 14. As the reaction medium flows away from fluid inlet 30, it can undergo further esterification and at least a portion of the vapor can escape the liquid phase as the liquid phase flows substantially horizontally through the internal volume of disengagement vessel 14. In one embodiment, the vapor in disengagement vessel 14, which can have a pressure less than about 25 psig or in the range of from about 1 to about 10 psig, or 2 to 5 psig, can then exit disengagement vessel 14 via a vapor outlet 32. The resulting vapor stream can then be transported to another location for further processing and/or disposal. As shown in FIG. 1, at least a fraction of the separated predominantly liquid portion of the reaction medium in disengagement vessel 14 can be withdrawn via liquid product outlet 20 and can enter product conduit 114 of recirculation loop 16, which will be discussed in more detail shortly.

As discussed previously, at least a portion of the reaction medium flowing through disengagement vessel 14 can undergo further esterification. In one embodiment, the conversion of predominantly liquid stream in product conduit 114 can be up to about 5 percentage points, up to about 2 percentage points, or up to 1 percentage point greater than the conversion of the stream entering fluid inlet 30 of disengagement vessel 14. Generally, the predominantly liquid product stream comprising PET monomer and/or oligomer in product conduit 114 can have conversion of at least about 80 percent, at least about 85 percent, at least about 90 percent, at least 95 percent, or at least about 98 percent.

In one embodiment, the conversion achieved in disengagement vessel 14 can occur during a relatively short residence time and with little or no heat input. For example, the average residence time of the reaction medium in disengagement vessel 14 can be less than about 200 minutes, less than about 60 minutes, less than about 45 minutes, less than about 30 minutes, or less than 15 minutes. Further, the amount of heat transferred to the reaction medium in disengagement vessel 14 can be less than about 100 BTU per pound of reaction medium (BTU/lb), less than about 20 BTU/lb, less than about 5 BTU/lb, or less than 1 BTU/lb.

With minimal or no heat input in disengagement vessel 14, the average temperature of the liquid product exiting liquid product outlet 20 of disengagement vessel 14 can be within about 50° C., about 30° C., about 20° C., or 15° C. of the average temperature of the fluid entering disengagement vessel 14 via fluid inlet 30. Generally, the average temperature of the liquid stream exiting liquid product outlet 20 of disengagement vessel 14 can be in the range of from about 220° C. to about 320° C., about 240° C. to about 300° C., or about 250° C. to about 275° C.

In the embodiment illustrated in FIG. 1, disengagement vessel 14 can be a substantially empty, unagitated, unheated, generally cylindrical, horizontally elongated vessel. Disengagement vessel 14 can have a length-to-diameter (L:D) ratio in the range of from about 1.25:1 to about 50:1, about 1.5:1 to about 20:1, about 2:1 to about 10:1, or 2.5:1 to 5:1, where L is the maximum internal dimension of disengagement vessel 14 measured in the direction of elongation of disengagement vessel 14 and D is the maximum internal dimension of disengagement vessel 14 measured perpendicular to the direction of elongation of disengagement vessel 14.

In one embodiment, fluid inlet 30, liquid product outlet 20, and vapor outlet 32 can be spaced from one another in a manner that provides sufficient esterification and enhances disengagement/separation of the vapor and liquid phases. For example, liquid product outlet 20 and vapor outlet 32 can be horizontally spaced from fluid inlet 30 by at least about 1.25 D, at least about 1.5 D, or at least 2.0 D. Further, liquid product outlet 20 and vapor outlet 32 can be vertically spaced from one another by at least about 0.5 D, at least about 0.75 D, or at least 0.95 D.

As illustrated in FIG. 1, disengagement vessel 14 can comprise a fluid distributor 34 to aid in the effective distribution of the feed to disengagement vessel 14. In the embodiment illustrated in FIG. 1, fluid distributor 34 can be a substantially horizontally extending pipe having a downwardly curved distal end that defines fluid inlet 30 with a downwardly facing orientation. Alternatively, fluid distributor 34 can define a plurality of openings (not shown) for discharging the partially esterified feed at multiple horizontally spaced locations in disengagement vessel 14. In one embodiment of the present invention, the average depth of the predominantly liquid phase of the reaction medium in disengagement vessel 14 can be maintained at less than about 0.75 D, less than about 0.50 D, less than about 0.25 D, or less than 0.15 D as it travels substantially horizontally through disengagement vessel 14.

As shown in FIG. 1, upon entering disengagement vessel 14, the reaction medium exiting fluid distributor 34 can begin to foam as the vapor bubbles disengage from the liquid portion of the reaction medium. Generally, foam production can decrease along the length of disengagement vessel 14 as the vapor disengages from the liquid phase of the reaction medium so that, in one embodiment, substantially no foam exits liquid product outlet 20 and/or vapor outlet 32 of disengagement vessel 14.

To help ensure that substantially no foams exits vapor outlet 32 of disengagement vessel 14, a downwardly extending baffle 36 can be employed in disengagement vessel 14. Baffle 36 can generally be disposed between fluid inlet 30 and vapor outlet 32 of disengagement vessel 14, but closer to vapor outlet 32 than to fluid inlet 30. Baffle 36 can extend downwardly from the top of disengagement vessel 14 proximate vapor outlet 32 and can function to physically block the flow of foam, if any, towards vapor outlet 32. In one embodiment of the present invention, baffle 36 can present a bottom edge vertically spaced at least about 0.25 D, at least about 0.5 D, or at least 0.75 D from the bottom of disengagement vessel 14.

The total internal volume defined within disengagement vessel 14 can depend on a number of factors, including, for example, the overall hydrodynamic requirements of esterification system 10. In one embodiment of the present invention, the total internal volume of disengagement vessel 14 can be at least about 25 percent, at least about 50 percent, at least about 75 percent, at least about 100 percent, or at least 150 percent of the total internal volume of recirculation loop 16, described in further detail below. In yet another embodiment of the present invention, the total internal volume of disengagement vessel 14 can be at least about 25 percent, at least about 50 percent, at least about 75 percent, or at least 150 percent of the aggregate internal volume of recirculation loop 16, the flow passageway within heat exchanger 12, and conduit 112.

Referring again to FIG. 1, the liquid ester product discharged from liquid outlet 20 into product conduit 114 can then flow into suction port 24 of recirculation pump 22. As shown in FIG. 1, the stream exiting discharge port 26 of recirculation pump 22 can enter discharge conduit 116 prior to being split into a product portion in ester product conduit 118 and a recirculation portion in recirculation conduit 100. The splitting of the stream exiting discharge port 26 of recirculation pump 22 can be carried out so that the ratio of the mass flow rate of the recirculation portion in conduit 100 to the mass flow rate of the product portion in conduit 118 can be in the range of from about 0.25:1 to about 30:1, about 0.5:1 to about 20:1, or 2:1 to 15:1. As previously discussed, the recirculation portion in conduit 100 can eventually be employed as esterification feed to exchanger inlet 18 of heat exchanger 12 via conduit 110.

The product portion of the liquid ester product in conduit 118 can be routed to a downstream location for further processing, storage, or other use. In one embodiment, at least a fraction of the product portion in conduit 118 can be subjected to further esterification in a second esterification zone. In another embodiment, at least part of the product portion in conduit 118 can be subjected to polycondensation in a downstream polycondensation zone.

While several embodiments of the present invention were described herein as they relate to melt-phase polyester systems, it should be understood that certain embodiments of the present invention may find application in a wide variety of chemical processes. For example, reaction systems configured in accordance with certain embodiments of the present invention may be advantageously employed in any process where chemical reactions take place in the liquid phase of a reaction medium and a vapor byproduct is produced as a result of the chemical reaction. Further, reaction systems configured in accordance with certain embodiments of the present invention can be advantageously employed in chemical processes wherein at least a portion of the reaction medium forms foam during processing.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

DEFINITIONS

As used herein, the terms "a," "an," "the," and "said" means one or more.

As used herein, the term "agitation" refers to work dissipated into a reaction medium causing fluid flow and/or mixing.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "average chain length" means the average number of repeating units in the polymer. For a polyester, average chain length means the number of repeating acid and alcohol units. Average chain length is synonymous with the number average degree of polymerization (DP). The average chain length can be determined by various means known to those skilled in the art. For example, 1H-NMR can be used to directly determine the chain length based upon end group analysis, and light scattering can be used to measure the weight average molecular weight with correlations used to determine the chain length. Chain length is often calculated based upon correlations with gel permeation chromatography (GPC) measurements and/or viscosity measurements.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise," provided above.

As used herein, the term "conversion" is used to describe a property of the liquid phase of a stream that has been subjected to esterification, wherein the conversion of the esterified stream indicates the percentage of the original acid end groups that have been converted (i.e., esterified) to ester groups. Conversion can be quantified as the number of converted end groups (i.e., alcohol end groups) divided by the total number of end groups (i.e., alcohol plus acid end groups), expressed as a percentage.

As used herein, the term "esterification" refers to both esterification and ester exchange reactions.

As used herein, the terms "having," "has," and "have" have the same open-ended meaning as "comprising," "comprises," and "comprise," provided above.

As used herein, the term "horizontally elongated" means that the maximum horizontal dimension is larger than the maximum vertical dimension.

As used herein, the terms "including," "includes," and "include" have the same open-ended meaning as "comprising," "comprises," and "comprise," provided above.

As used herein, the term "mechanical agitation" refers to agitation of a reaction medium caused by physical movement of a rigid or flexible element(s) against or within the reaction medium.

As used herein, the term "monomer" refers to a polymeric species comprising less than about three chain lengths.

As used herein, the term "oligomer" refers to a polymeric species comprising in the range of from about 7 to about 50 chain lengths.

As used herein, the term "polymer" refers to a polymeric species comprising greater than about 50 chain lengths.

As used herein, the terms "polyethylene terephthalate" and "PET" include PET homopolymers, PET copolymers, and PETG.

As used herein, the term "PET copolymer" refers to PET that has been modified by up to 10 mole percent with one or more added comonomers. For example, the term "PET copolymer" includes PET modified with up to 10 mole percent isophthalic acid on a 100 mole percent carboxylic acid basis. In another example, the term "PET copolymer" includes PET modified with up to 10 mole percent 1,4-cyclohexane dimethanol (CHDM) on a 100 mole percent diol basis.

As used herein, the term "PETG" refers to PET modified with 10 to 50 percent 1,4-cyclohexane dimethanol (CHDM) on a 100 mole percent diol basis.

As used herein, the term "polyester" refers not only to traditional polyesters, but also includes polyester derivatives, such as, for example, polyetheresters, polyester amides, and polyetherester amides.

As used herein, "predominately liquid" means more than 50 volume percent liquid.

As used herein, the term "reaction medium" refers to any medium subjected to chemical reaction.

As used herein, the term "residue" refers to the moiety that is the resulting product of the chemical species in a particular reaction scheme or subsequent formulation or chemical product, regardless of whether the moiety is actually obtained from the chemical species.

As used herein, the term "vapor byproduct" includes the vapor generated by a desired chemical reaction (i.e., a vapor co-product) and any vapor generated by other reactions (i.e., side reactions) of the reaction medium.

Claims Not Limited to Disclosed Embodiments

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A process comprising:
   (a) subjecting a reaction medium to esterification in a heat exchanger to thereby produce a warmed product stream;
   (b) separating at least a portion of said warmed product stream into a predominantly liquid stream and a predominantly vapor stream in a disengagement vessel; and
   (c) recirculating at least a portion of said predominantly liquid stream to said heat exchanger via a recirculation loop,
   wherein said recirculation loop comprises a pump used to transport at least a portion of said predominantly liquid stream to said heat exchanger,
   wherein the pressure of said warmed product stream exiting said heat exchanger is within about 30 psi of the pressure of said warmed product stream entering said disengagement vessel, and
   wherein said predominantly liquid stream comprises less than 1.0 weight percent diethylene glycol.

2. The process of claim 1, wherein said warmed product stream exits an exchanger outlet of said heat exchanger, wherein said predominantly liquid stream exits a liquid product outlet of said disengagement vessel, wherein said pump defines a suction port for receiving at least a portion of said predominantly liquid stream, wherein said suction port is spaced from said liquid product outlet by a first vertical distance ($Y_1$), wherein said suction port is spaced from said exchanger outlet by a second vertical distance ($Y_2$), wherein the ratio of said second vertical distance to said first vertical distance ($Y_2$:$Y_1$) is in the range of from about 0.4 to about 2.0.

3. The process of claim 1, wherein the pressure of said warmed product stream exiting said heat exchanger is within about 10 psi of the pressure of said warmed product stream entering said disengagement vessel.

4. The process of claim 1, wherein the pressure of said warmed product stream exiting said heat exchanger is in the range of from about 5 to about 35 psig.

5. The process of claim 1, wherein said predominantly liquid stream comprises less than 0.75 weight percent diethylene glycol.

6. The process of claim 1, wherein said heat exchanger comprises tubes at least partly surrounded by a heat transfer medium, wherein said reaction medium flows through said tubes, wherein the amount of heat added to said reaction medium in said heat exchanger is in the range of from about 100 to about 5,000 BTU per pound of reaction medium.

7. The process of claim 1, wherein said disengagement vessel is horizontally elongated.

8. The process of claim 1, wherein said warmed product stream forms a predominantly vapor phase and a predominantly liquid phase in said disengagement vessel, wherein said predominantly liquid phase flows substantially horizontally through said disengagement vessel.

9. The process of claim 1, wherein esterification is carried out in said disengagement vessel.

10. The process of claim 9, wherein the conversion of said reaction medium increases by at least 10 percentage points in said heat exchanger, wherein the conversion of said predominantly liquid stream exiting said disengagement vessel is not more than 5 percentage points greater than the conversion of said warmed product stream exiting said heat exchanger.

11. The process of claim 1, further comprising, agitating said reaction medium in said disengagement vessel, wherein less than 50 percent of the agitation is provided by mechanical agitation.

12. The process of claim 1, wherein said reaction medium comprises an alcohol and an acid.

13. The process of claim 12, further comprising introducing additional quantities of said alcohol and said acid into said recirculation loop.

14. The process of claim 1, further comprising withdrawing a portion of said predominantly liquid stream from said recirculation loop to form a withdrawn predominantly liquid stream and subjecting at least a portion of said withdrawn predominantly liquid stream to further esterification in a downstream esterification zone and/or subjecting at least a portion of said withdrawn predominantly liquid stream to polycondensation in a downstream polycondensation zone.

15. An esterification process comprising:
(a) heating a reaction medium in a heat exchanger to thereby produce a warmed product stream, wherein esterification of said reaction medium is carried out in said heat exchanger;
(b) withdrawing at least a portion of said warmed product stream via an exchanger outlet of said heat exchanger;
(c) introducing at least a portion of said warmed product stream into a disengagement vessel via a fluid inlet;
(d) separating at least a portion of said warmed product stream introduced into said disengagement vessel into a predominantly liquid fraction and a predominantly vapor fraction;
(e) withdrawing at least a portion of said predominantly liquid fraction from said disengagement vessel via a liquid product outlet to form a predominantly liquid stream; and
(f) recirculating at least a portion of said predominantly liquid stream to an exchanger inlet of said heat exchanger via a recirculation loop,
wherein said recirculation loop comprises a pump for transporting at least a portion of said predominantly liquid stream through said recirculation loop,
wherein said pump defines a suction port located at a lower elevation than said liquid product outlet,
wherein said liquid product outlet is spaced from said suction port of said pump by a first vertical distance ($Y_1$),
wherein said exchanger outlet is spaced from said suction port of said pump by a second vertical distance ($Y_2$),
wherein the ratio of said second vertical distance to said first vertical distance ($Y_2:Y_1$) is greater than 0.25, and
wherein said predominantly liquid stream comprises less than 1.0 weight percent diethylene glycol.

16. The process of claim 15, wherein the pressure of said warmed product stream exiting said heat exchanger via said exchanger outlet is within about 30 psi of the pressure of said warmed product stream introduced into said disengagement vessel via said fluid inlet.

17. The process of claim 15, wherein the pressure of said warmed product stream is in the range of from about 5 to about 35 psig.

18. The process of claim 15, wherein $Y_2:Y_1$ is in the range of from about 0.4 to about 2.0.

19. The process of claim 15, wherein $Y_1$ is in the range of from about 5 to about 200 feet.

20. The process of claim 15, wherein esterification is carried out in said disengagement vessel.

21. The process of claim 20, wherein the conversion of said reaction medium increases by at least 10 percentage points in said heat exchanger, wherein the conversion of said predominantly liquid stream exiting said liquid product outlet is not more than 5 percentage points greater than the conversion of said warmed product stream exiting said exchanger outlet.

22. The process of claim 15, wherein the conversion of said predominantly liquid stream exiting said liquid product outlet is at least 80 percent.

23. The process of claim 15, wherein said disengagement vessel has a length-to-diameter ratio in the range of from about 1.25:1 to abut 50:1.

24. The process of claim 15, wherein said reaction medium comprises terephthalic acid and/or ethylene glycol.

25. The process of claim 15, further comprising withdrawing a portion of said predominantly liquid stream from said recirculation loop to form a withdrawn predominantly liquid stream and subjecting at least a portion of said withdrawn predominantly liquid stream to further esterification in a downstream esterification zone and/or subjecting at least a portion of said withdrawn predominantly liquid stream to polycondensation in a downstream polycondensation zone.

* * * * *